US010826752B2

(12) United States Patent
Schwindt et al.

(10) Patent No.: US 10,826,752 B2
(45) Date of Patent: Nov. 3, 2020

(54) METHOD AND SYSTEM FOR DETERMINING DEGRADATION IN PERFORMANCE OF AN ELECTRONIC DEVICE CONNECTED TO A COMMUNICATION NETWORK

(71) Applicant: GE Aviation Systems Limited, Cheltenham, Gloucestershire (GB)

(72) Inventors: Stefan Alexander Schwindt, Cheltenham (GB); Barry Foye, Cheltenham (GB)

(73) Assignee: GE Aviation Systems Limited, Cheltenham, Gloucestershire (GB)

( * ) Notice: Subject to any disclaimer, the term of this patent is extended or adjusted under 35 U.S.C. 154(b) by 0 days.

(21) Appl. No.: 16/007,317

(22) Filed: Jun. 13, 2018

(65) Prior Publication Data

US 2019/0013997 A1   Jan. 10, 2019

(30) Foreign Application Priority Data

Jul. 4, 2017 (GB) .................................. 1710757.4

(51) Int. Cl.
*H04L 12/24* (2006.01)
*H04L 12/26* (2006.01)
(Continued)

(52) U.S. Cl.
CPC .............. *H04L 41/06* (2013.01); *B64D 45/00* (2013.01); *B64F 5/60* (2017.01); *H04L 43/065* (2013.01);
(Continued)

(58) Field of Classification Search
CPC ........ H04L 41/06; H04L 43/065; H04L 67/12
(Continued)

(56) References Cited

U.S. PATENT DOCUMENTS 8,612,581 B1   12/2013 Craig et al.
8,949,668 B2   2/2015 Hanks et al.
(Continued)

FOREIGN PATENT DOCUMENTS

EP   2987729 A1   2/2016

OTHER PUBLICATIONS

Great Britain Search Report Corresponding to Application No. 1710757 dated Jan. 4, 2018.
(Continued)

*Primary Examiner* — Marthe Y Marc-Coleman
(74) *Attorney, Agent, or Firm* — Dority & Manning, P.A.

(57) ABSTRACT

A method for determining degradation in performance of an electronic device connected to a communication network for an aerial vehicle includes monitoring, by one or more computing device(s), communications on the communication network during a validation period. The method further includes generating, by the computing device(s), a baseline operating profile of the electronic device based, at least in part, on the communications monitored during the validation period. In addition, the method includes monitoring, by the computing device(s), communications on the communication network during a post-validation period. The method further includes determining, by the computing device(s), a present operating profile of the electronic device based, at least in part, on the communications monitored during the post-validation period. In addition, the method includes determining, by the computing device(s), degradation in performance of the electronic device when the present operating profile deviates from the baseline operating profile.

19 Claims, 9 Drawing Sheets

(51) Int. Cl.
 B64D 45/00 (2006.01)
 B64F 5/60 (2017.01)
 H04L 29/08 (2006.01)
 G06F 11/30 (2006.01)
(52) U.S. Cl.
 CPC .............. *H04L 43/08* (2013.01); *H04L 67/12* (2013.01); *B64D 2045/0085* (2013.01)
(58) Field of Classification Search
 USPC .......................................................... 701/29
 See application file for complete search history.

(56) References Cited

U.S. PATENT DOCUMENTS

| | | | |
|---|---|---|---|
| 9,292,688 B2 | 3/2016 | Avasarala et al. | |
| 2015/0302930 A1* | 10/2015 | Moshayedi | G11C 5/141 |
| | | | 365/185.18 |
| 2016/0057160 A1 | 2/2016 | Buehler et al. | |
| 2016/0362197 A1* | 12/2016 | Chippar | G07C 5/006 |
| 2017/0057667 A1* | 3/2017 | Ward | F04B 49/065 |
| 2017/0078398 A1* | 3/2017 | Haidar | H04L 67/04 |
| 2018/0297718 A1* | 10/2018 | Adibhatla | B64F 5/60 |

OTHER PUBLICATIONS

Canadian Office Action Corresponding to Application No. 3009744 dated Mar. 3, 2020.

\* cited by examiner

| BASELINE OPERATING PROFILE 600 | | | | |
|---|---|---|---|---|
| | | ENVIROMENTAL PARAMETERS | | |
| FLIGHT PHASE | RESPONSE TIME (ms) 610 | OPERATING TEMP (K) 620 | VIBRATION MEASUREMENT (Pa) 630 | AMOUNT OF TRAFFIC (NO UNITS) 640 |
| TAKEOFF | 612 | 622 | 632 | 642 |
| CLIMB | 614 | | | |
| CRUISE | | | | |
| APPROACH | | | | |
| LANDING | | | | |

FIG. 6

| PRESENT OPERATING PROFILE | | | | |
|---|---|---|---|---|
| | | ENVIROMENTAL PARAMETERS | | |
| FLIGHT PHASE | RESPONSE TIME (ms) | OPERATING TEMP (K) | VIBRATION MEASUREMENT (Pa) | AMOUNT OF TRAFFIC (NO UNITS) |
| | 710 | 720 | 730 | 740 |
| TAKEOFF | 712 | 722 | 732 | 742 |
| CLIMB | 714 | | | |
| CRUISE | | | | |
| APPROACH | | | | |
| LANDING | | | | |

FIG. 7

METHOD AND SYSTEM FOR DETERMINING DEGRADATION IN PERFORMANCE OF AN ELECTRONIC DEVICE CONNECTED TO A COMMUNICATION NETWORK

FIELD

The present subject matter relates generally to a method and system for monitoring operation of an electronic device connected to a communication network for an aerial vehicle.

BACKGROUND

Deterministic networks attempt to control when a data packet arrives at its destination (e.g., within a bounded timeframe). This category of networking can be used for a myriad of applications such as industrial automation, vehicle control systems, and other systems that require the precise delivery of control commands to a controlled device. In particular, a protocol can define communications between electronic devices connected to a communication network used in aviation, automotive and industrial control applications. For example, the protocol may permit a first electronic device on the communication network to communicate with a second electronic device on the communication network. However, the protocol may preclude the first electronic device from communicating with a third electronic device on the communication network. In addition, the protocol may define the content of messages exchanged between the first electronic device and the second electronic device. In this way, communications on the network can be deterministic.

BRIEF DESCRIPTION

Deterministic networks attempt to control when a data packet arrives at its destination (e.g., within a bounded timeframe). This category of networking can be used for a myriad of applications such as industrial automation, vehicle control systems, and other systems that require the precise delivery of control commands to a controlled device.

Aspects and advantages of the present disclosure will be set forth in part in the following description, or may be obvious from the description, or may be learned through practice of the present disclosure.

In one example embodiment, a method for determining degradation in performance of an electronic device connected to a communication network for an aerial vehicle includes monitoring, by one or more computing device(s), communications on the communication network during a validation period. The method further includes generating, by the computing device(s), a baseline operating profile of the electronic device based, at least in part, on the communications monitored during the validation period. In addition, the method includes monitoring, by the computing device(s), communications on the communication network during a post-validation period. The method further includes determining, by the computing device(s), a present operating profile of the electronic device based, at least in part, on the communications monitored during the post-validation period. In addition, the method includes determining, by the computing device(s), degradation in performance of the electronic device when the present operating profile deviates from the baseline operating profile. The method further includes generating, by the computing device(s), a notification indicating the degradation in the performance of the electronic device.

In another example embodiment, a system for determining degradation in performance of an electronic device connected to a communication network for an aerial vehicle includes one or more computing device(s) connected to the communication network. The computing device(s) include one or more processor(s) and one or more memory device(s) storing instructions that can be executed by the one or more computing device(s) to perform operations. The computing device(s) can be configured to monitor communications on the communication network during a validation period. In addition, the computing device(s) can be configured to generate a baseline operating profile of the electronic device based, at least in part, on the communications monitored during the validation period. The computing device(s) can also be configured to monitor communications on the communication network during a post-validation period. In addition, the computing device(s) can generate a present operating profile of the electronic device based, at least in part, on the communications monitored during the post-validation period. The computing device(s) can be configured to determine degradation in performance of the electronic device when the present operating profile deviates from the baseline operating profile. In addition, the computing device(s) can automatically schedule the aerial vehicle for maintenance when the present operating profile deviates from the baseline operating profile.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended Figs., in which:

FIG. 6 illustrates a baseline profile for the electronic device of FIG. 4 according to example embodiments of the present disclosure;

FIG. 7 illustrates a present operating profile for the electronic device of FIG. 4 according to example embodiments of the present disclosure;

DETAILED DESCRIPTION

Figure 1:
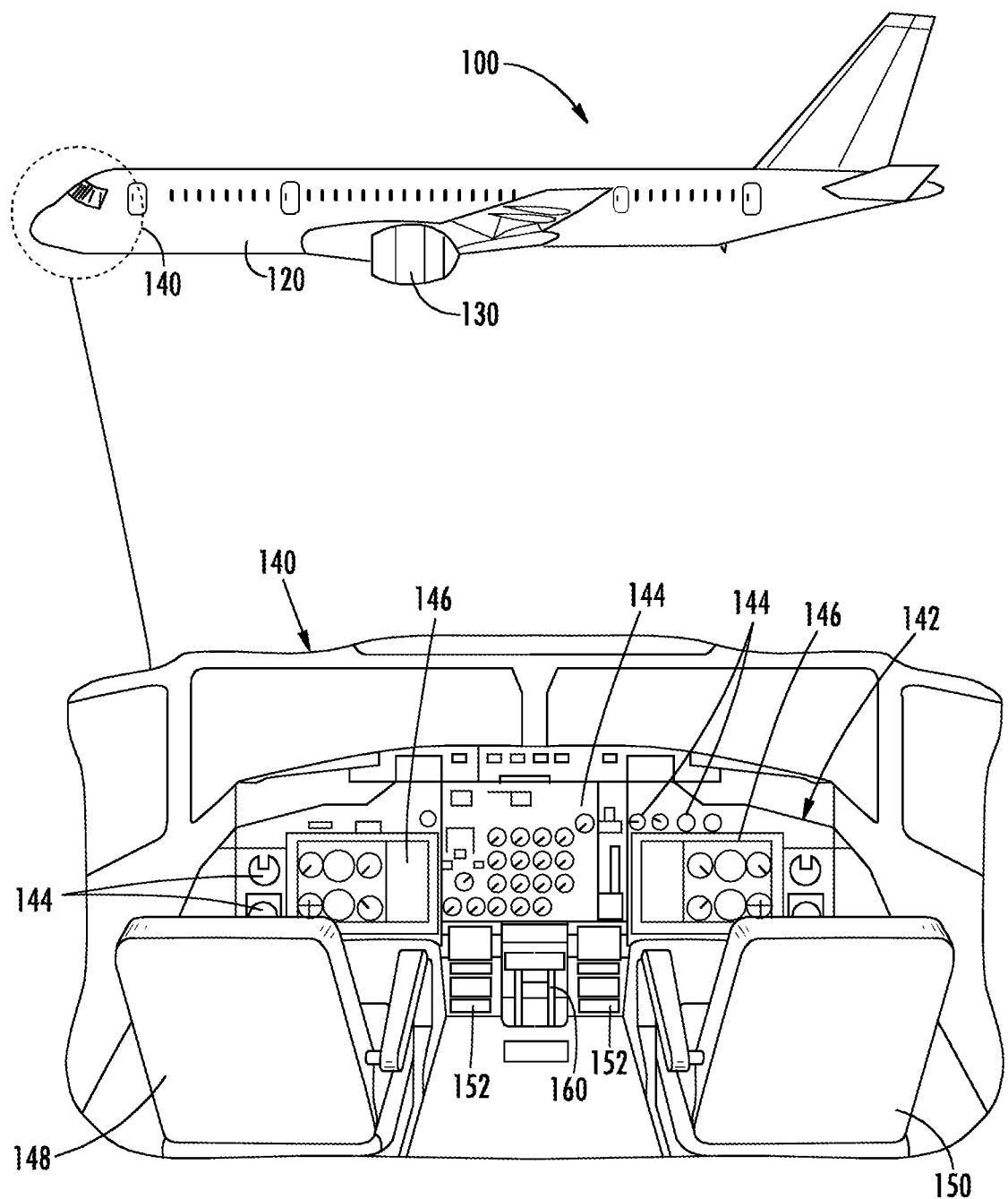
FIG. 1 illustrates an aerial vehicle according to example embodiments of the present disclosure.

Reference will now be made in detail to present embodiments of the present disclosure, one or more examples of which are illustrated in the accompanying drawings. The detailed description uses numerical and letter designations to refer to features in the drawings.

As used herein, the terms "first" and "second" can be used interchangeably to distinguish one component from another and are not intended to signify location or importance of the individual components. The singular forms "a", "an", and "the" include plural references unless the context clearly dictates otherwise.

Example embodiments of the present disclosure are directed to systems and methods for detecting degradation in performance of an electronic device connected to a communication network for an aerial vehicle. In one example embodiment, one or more computing devices connected to the communication network can monitor communications on the communication network during both a validation period and a post-validation period. The validation period can include a period of time during which operation of the electronic can be validated. In particular, the validation period can span one or more test-flights of the aerial vehicle. In contrast, the post-validation period can include a period of time following the validation period. However, similar to the validation period, the post-validation period can also span one or more flights of aerial vehicle. In addition, the one or more test-flights and the one or more flights can each include a plurality of flight phases.

In example embodiments, the one or more computing devices can generate a baseline operating profile of the electronic device. More specifically, the one or more computing devices can generate the baseline operating profile based, at least in part, on communications monitored during the validation period. In example embodiments, the baseline operating profile can include a first plurality of values. In particular, each value of the first plurality of values can indicate a baseline response time of the electronic device during one flight phase of the test-flight(s). In addition, the baseline operating profile can include one or more environmental parameters affecting operation of the electronic device. The one or more environmental parameters can include an operating temperature of the electronic device, a vibration measurement indicating vibration of the electronic device, a humidity measurement indicating humidity of an environment in which the electronic device is operating, an altitude measurement, and an amount of traffic on the communication network.

The one or more computing devices can also generate a present operating profile of the electronic device. More specifically, the one or more computing devices can generate the present operating profile during the post-validation period. In example embodiments, the present operating profile can include a second plurality of values. In particular, each value of the second plurality of values can indicate a present response time of the electronic device during one flight phase of the flight(s).

The one or more computing devices can determine degradation in the performance of the electronic device when the present operating profile deviates from the baseline operating profile. In this way, degradation in the performance of the electronic device can be determined without using additional sensors in the device. Additionally, the one or more computing devices can transmit the present operating profile of the electronic device to a remote computing system configured to estimate an amount of time remaining before the electronic device become inoperable (that is, the electronic device can no longer perform its primary functions). In example embodiments, the remote computing device can include a model that is trained, at least in part, on an operating profile of one or more electronic devices that are identical to electronic device and connected to a communication network for another aerial vehicle. The model can learn how the one or more environmental parameters can affect a lifespan of the one or more electronic devices. As such, the model can estimate an amount of time remaining before the electronic device becomes inoperable.

The systems and methods described herein can provide a number of technical effects and benefits. For instance, if the aerial vehicle is one of a plurality of aerial vehicles owned by an airliner, estimating the amount of time before the electronic device becomes inoperable can allow the airliner to schedule maintenance on the aerial vehicle at a time that minimizes economic losses. More specifically, the airliner can schedule maintenance at a time when the aerial vehicle is not needed.

FIG. 1 depicts an aerial vehicle 100 according to example embodiments of the present disclosure. As shown, the aerial vehicle 100 can include a fuselage 120, one or more engine(s) 130, and a cockpit 140. In example embodiments, the cockpit 140 can include a flight deck 142 having various instruments 144 and flight displays 146. It should be appreciated that instruments 144 can include, without limitation, a dial, gauge, or any other suitable analog device.

A first user (e.g., a pilot) can be present in a seat 148 and a second user (e.g., a co-pilot) can be present in a seat 150. The flight deck 142 can be located in front of the pilot and co-pilot and may provide the flight crew (e.g., pilot and co-pilot) with information to aid in operating the aerial vehicle 100. The flight displays 146 can include primary flight displays (PFDs), multi-function displays (MFDs), or both. During operation of the aerial vehicle 100, both the instruments 144 and flight displays 146 can display a wide range of vehicle, flight, navigation, and other information used in the operation and control of the aerial vehicle 100.

The instruments 144 and flight displays 146 may be laid out in any manner including having fewer or more instruments or displays. Further, the flight displays 146 need not be coplanar and need not be the same size. A touch screen display or touch screen surface (not shown) may be included in the flight displays 146 and may be used by one or more flight crew members, including the pilot and co-pilot, to interact with the aerial vehicle 100. The touch screen surface may take any suitable form including that of a liquid crystal display (LCD) and may use various physical or electrical attributes to sense inputs from the flight crew. It is contemplated that the flight displays 146 can be dynamic and that one or more cursor control devices (not shown) and/or one or more multifunction keyboards 152 can be included in the cockpit 140 and may be used by one or more flight crew members to interact with systems of the aerial vehicle 100. In this manner, the flight deck 142 may be considered a user interface between the flight crew and the aerial vehicle 100.

Additionally, the cockpit 140 can include an operator manipulated input device 160 that allow members of the flight crew to control operation of the aerial vehicle 100. In one example embodiment, the operator manipulated input device 160 can be used to control the engine power of the one or more engines 130. More specifically, the operator manipulated input device 160 can include a lever having a handle, and the lever can be movable between a first position and a second position. As such, a flight crew member can move the lever between the first and second positions to control the engine power of the one or more engine(s) 130.

The numbers, locations, and/or orientations of the components of example aerial vehicle 100 are for purposes of illustration and discussion and are not intended to be limiting. As such, those of ordinary skill in the art, using the disclosures provided herein, shall understand that the numbers, locations, and/or orientations of the components of the aerial vehicle 100 can be adjusted without deviating from the scope of the present disclosure.

Figure 2:
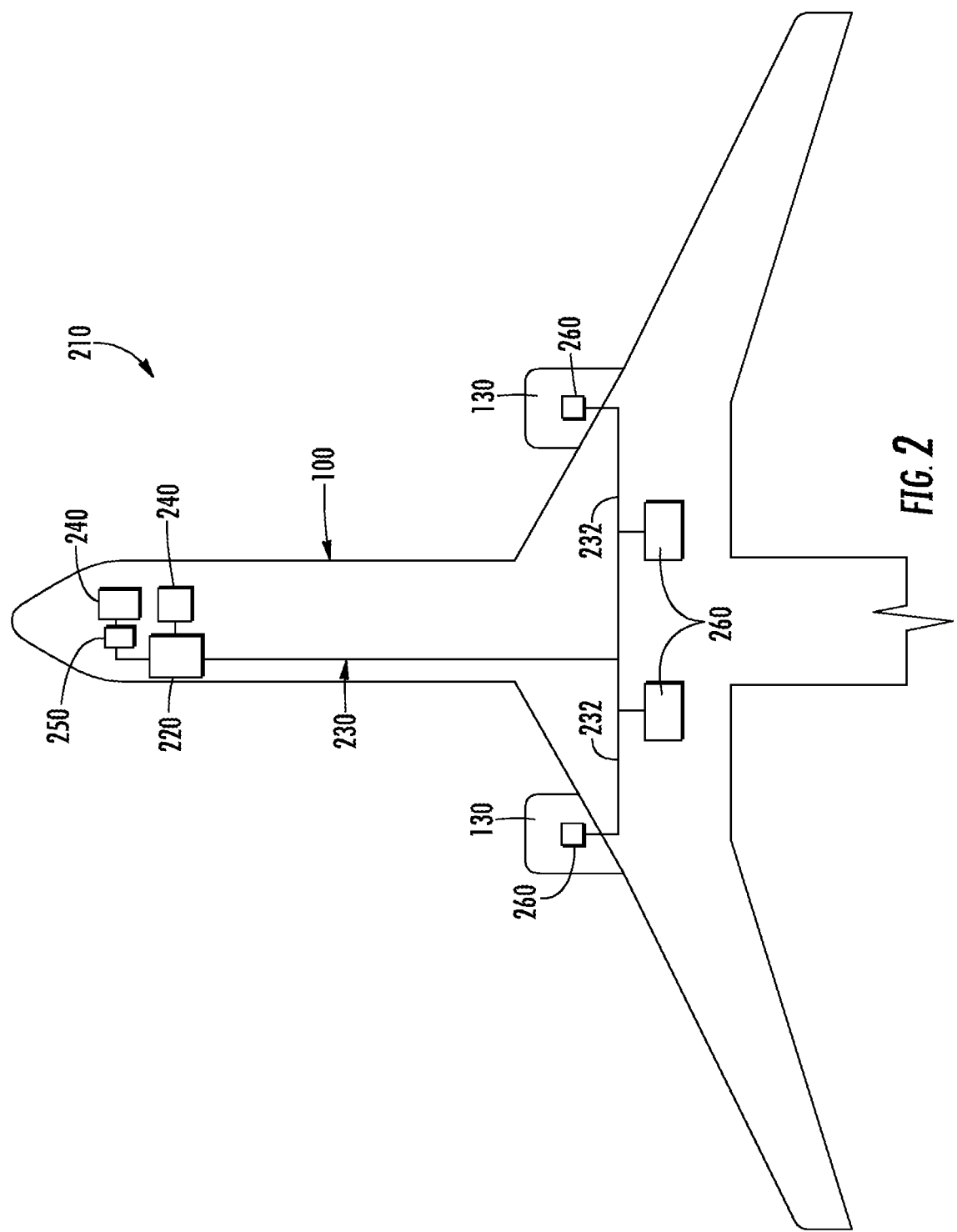
FIG. 2 illustrates a computing system for an aerial vehicle according to example embodiments of the present disclosure.

Referring now to FIG. 2, the aerial vehicle 100 can include an onboard computing system 210. As shown, the onboard computing system 210 can include one or more onboard computing device(s) 220 that can be associated with, for instance, an avionics system. In example embodiments, one or more of the onboard computing device(s) 220 can include a flight management system (FMS).

Alternatively or additionally, the one or more onboard computing device(s) 220 can be coupled to a variety of systems on the aerial vehicle 100 over a communication network 230.

The communication network 230 can include, for example, a local area network (LAN), a wide area network (WAN), SATCOM network, VHF network, a HF network, a Wi-fi network, a WiMAX network, a gatelink network and/or any other suitable communication network for transmitting message to and from the aerial vehicle 100. The communication network 230 can also include a data bus or combination of wired and/or wireless communication links. Such networking environments are commonplace in computer networks, intranets and the internet and may use a wide variety of different communication protocols. It will be appreciated that such network computing environments will typically encompass many types of computer system configuration, including personal computers, hand-held devices, multiprocessor systems, microprocessor-based or programmable consumer electronics, network PCs, minicomputers, mainframe computers, and the like. Moreover, the communication network 230 can include one or more communication lines 232 that can communicatively couple the various devices and/or systems onboard the aircraft 200. In example embodiments, the communication lines 232 of the communication network 230 can include a data bus or a combination of wired and/or wireless communication links. It should be appreciated that the communication lines 232 can be based on ARINC 429, MIL-STD 1553, IEEE 802.3, ARINC 825, Time Triggered Ethernet/SAE AS6802 or any other suitable standard.

In example embodiments, the onboard computing device(s) 220 can be in communication with a display system 240, such as the flight displays 146 (FIG. 1) of the aerial vehicle 100. More specifically, the display system 240 can include one or more display device(s) that can be configured to display or otherwise provide information generated or received by the onboard computing system 210. In example embodiments, information generated or received by the onboard computing system 210 can be displayed on the one or more display device(s) for viewing by flight crew members of the aerial vehicle 102. The display system 225 can include a primary flight display, a multipurpose control display unit, or other suitable flight displays commonly included within the cockpit 140 (FIG. 1) of the aerial vehicle 100.

The onboard computing device(s) 220 can also be in communication with a flight management computer 250. In example embodiments, the flight management computer 250 can automate the tasks of piloting and tracking the flight plan of the aerial vehicle 100. It should be appreciated that the flight management computer 250 can include or be associated with any suitable number of individual microprocessors, power supplies, storage devices, interface cards, auto flight systems, flight management computers, the flight management system (FMS) and other standard components. The flight management computer 250 can include or cooperate with any number of software programs (e.g., flight management programs) or instructions designed to carry out the various methods, process tasks, calculations, and control/display functions necessary for operation of the aerial vehicle 100. The flight management computer 250 is illustrated as being separate from the onboard computing device(s) 220. However, those of ordinary skill in the art, using the disclosures provided herein, will understand that the flight management computer 250 can also be included with or implemented by the onboard computing device(s) 220.

The onboard computing device(s) 220 can also be in communication with one or more aerial vehicle control system(s) 260. The aerial vehicle control system(s) 260 can be configured to perform various aerial vehicle operations and control various settings and parameters associated with the aerial vehicle 100. For instance, the aerial vehicle control system(s) 320 can be associated with one or more engine(s) 130 and/or other components of the aerial vehicle 100. The aerial vehicle control system(s) 260 can include, for instance, digital control systems, throttle systems, inertial reference systems, flight instrument systems, engine control systems, auxiliary power systems, fuel monitoring systems, engine vibration monitoring systems, communications systems, flap control systems, flight data acquisition systems, a flight management system (FMS), and other systems.

Figure 3:
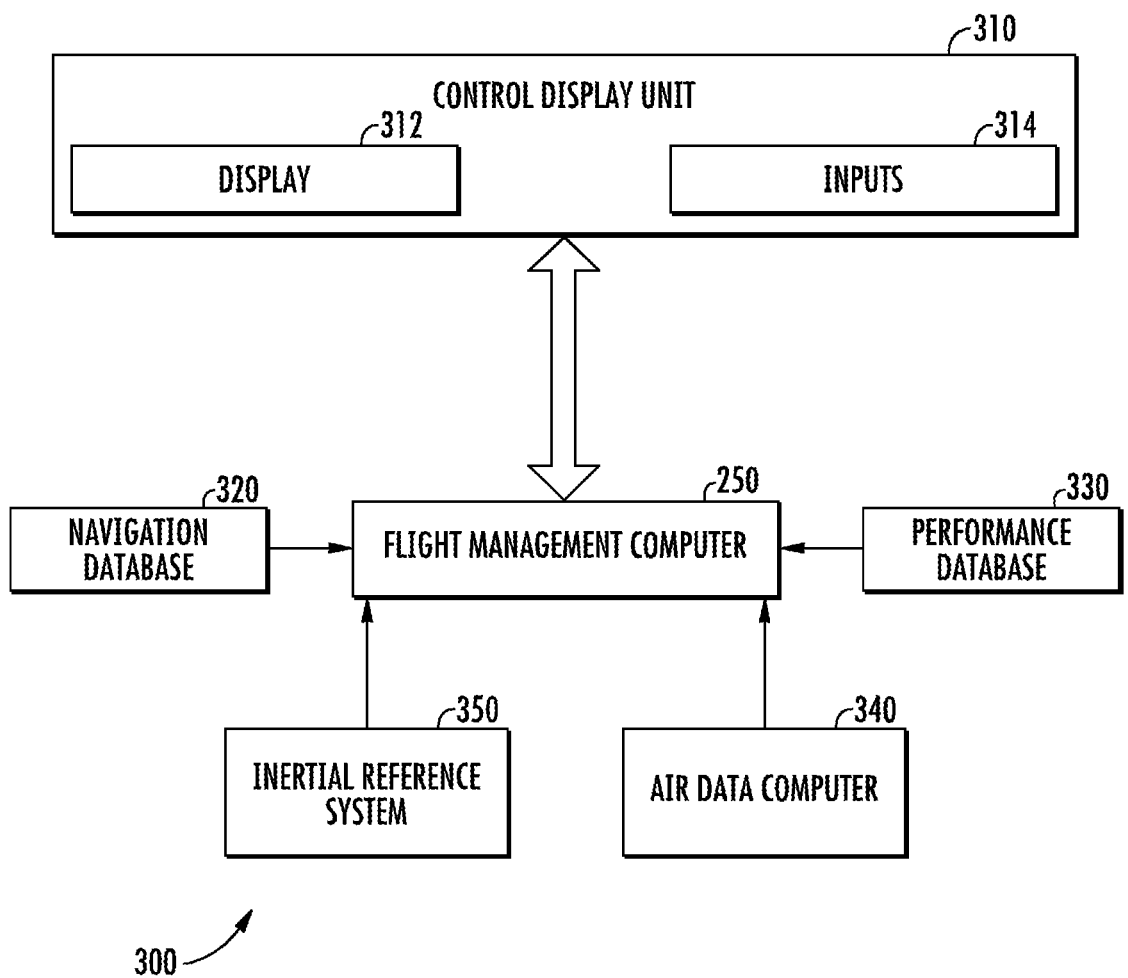
FIG. 3 illustrates an flight management system for an aerial vehicle according to example embodiments of the present disclosure.

Referring now to FIG. 3, the aerial vehicle 100 can include a flight management system 300 (FMS). The FMS 300 can provide flight planning and navigation capability and may be communicatively coupled with other avionics and aircraft systems as well, such as e.g., a global positioning system (GPS), VHF omnidirectional range/distance measuring equipment (VOR/DME), Inertial Reference/Navigation Systems (IRS/INS), flight controls, etc. As will be discussed below in more detail, the FMS 300 can include a control display unit (CDU) or multi-purpose control display unit (MCDU), and various databases, such as e.g., a navigation database (NDB) and an engine/aerial vehicle performance database.

In example embodiments, the FMS 300 can include a control display unit (CDU) 310 having a display 312 and one or more input devices 314 (e.g., keyboard). The one or more input devices 314 can be used to gather input data from the flight crew. The display 312 can present output data, such as a flight plan for the aerial vehicle 100. The CDU can include one or more processor(s) and one or more memory device(s). The one or more memory device(s) can store instructions that when executed by the one or more processor(s) cause the one or more processor(s) to perform the operations and functions, such as e.g., flight planning tasks. In this way, the CDU can interpret incoming data and automatically adjust the output data (e.g., flight plan) while the aerial vehicle 100 is airborne.

The FMS 300 can also include a navigation database 320 communicatively coupled to the flight management computer 250. In example embodiments, the navigation database 320 contains information stored on a memory device that allows the flight management computer 250 to generate a flight plan and update the flight plan as needed when the aerial vehicle 100 is airborne. In particular, the information stored in the navigation database 320 can include, without limitation, airways and associated waypoints. An airway can be a predefined path that connects one specified location (e.g., departing airport) to another specified location (e.g., destination airport). In addition, a waypoint can include one or more intermediate point(s) or place(s) on the predefined path defining the airway.

The FMS 300 can also include a performance database 330 communicatively coupled to the flight management computer 250. In example embodiments, the performance database 330 contains information stored on a memory device that allows the flight management computer 250 to compute optimal fuel burn and other performance-based indicators so that the flight plan can be adjusted in favor of a more efficient flight path. It should be appreciated that the navigation database 320 and the performance database 330 can be stored on the same memory device or on separate, dedicated devices. It should also be appreciated that the memory devices can be electrically erasable programmable read-only memory (EEPROM) cards communicatively coupled to the flight management computer 250.

Figure 4:
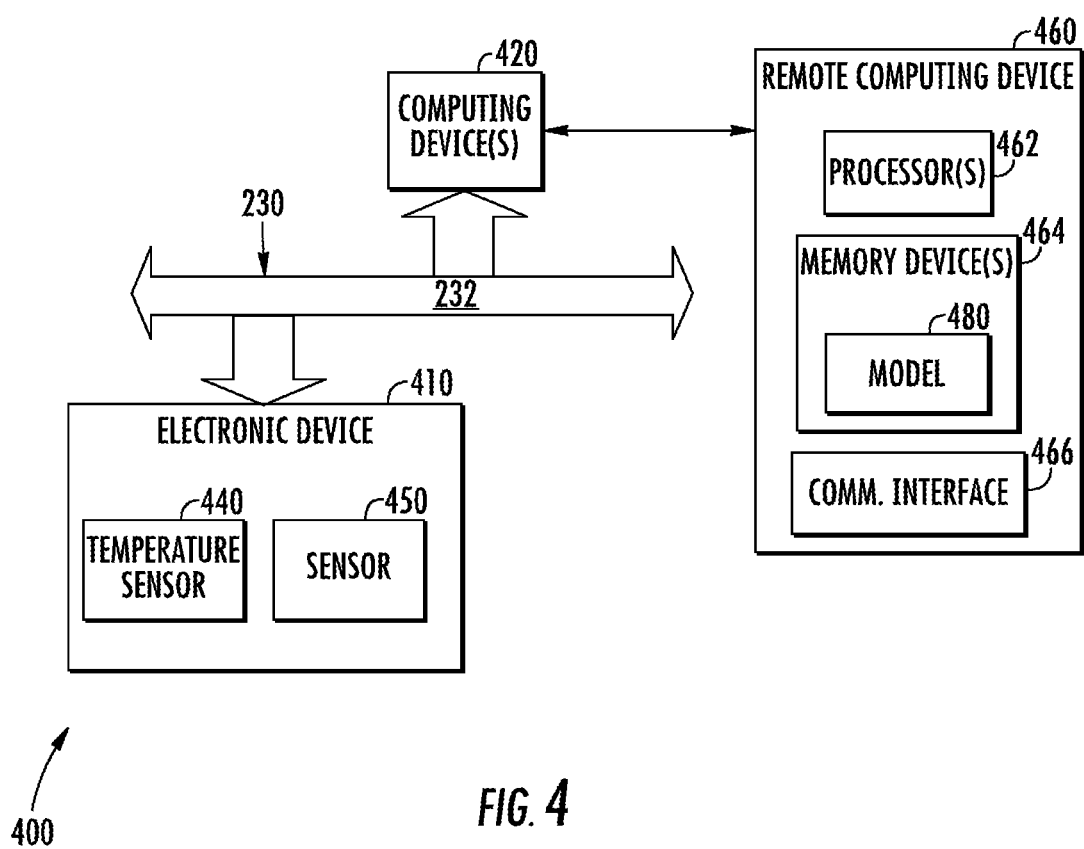
FIG. 4 illustrates an example system for determining degradation in performance of an electronic device connected to a communication network for an aerial vehicle.

FIG. 4 depicts an example embodiment of a system 400 for determining degradation in performance of one or more electronic device(s) 410 connected to the communication network 230 for the aerial vehicle 100. More specifically, the electronic device(s) 410 can be connected to the communication network 230 via the one or more communication lines 232. In an example embodiment, the electronic device 410 can be the flight management computer 250 (FIG. 3) of the FMS 300. In another example embodiment, the electronic device 410 can be an electronic actuator configured to control operation of a landing gear assembly (not shown) for the aerial vehicle 100. In yet another example embodiment, the electronic device 410 can be a flight control, such as the operator manipulated input device 160 discussed above with reference to FIG. 1. It should be appreciated, however, that the electronic device 410 can be any suitable electronic device that is communicatively coupled to the communication network 230.

Figure 5:
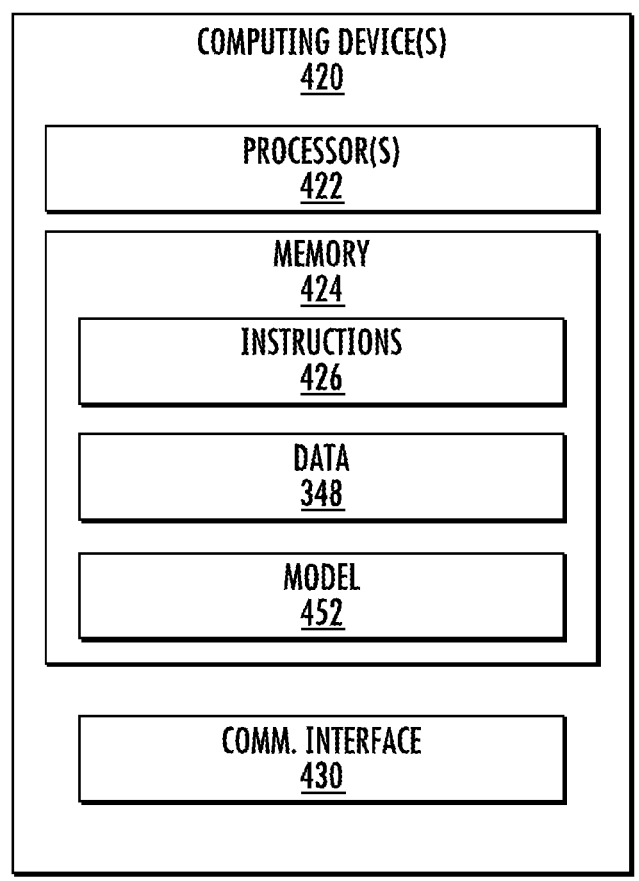
FIG. 5 illustrates a computing device according to example embodiments of the present disclosure.

Referring now to FIGS. 4 and 5 in combination, the system 400 can include one or more computing device(s) 420 communicatively coupled to the communication network 230. More specifically, the computing device(s) 420 can be communicatively coupled to the communication network 230 via the one or more communication lines 232. In alternative embodiments, however, the computing device(s) 420 can be communicatively coupled to the network 230 via a network switch. More specifically, the network switch can be connected to the communication lines 232 and the computing device(s) 420. In this way, communications (e.g., data packets) on the communication lines 232 can be routed to the computing device(s) 420 by way of the network switch.

As shown, the computing device(s) 420 can include one or more processor(s) 422 and one or more memory device(s) 424. The processor(s) 422 can include any suitable processing device, such as a microprocessor, microcontroller, integrated circuit, logic device, or other suitable processing device. The memory device(s) 424 can include one or more computer-readable media, including, but not limited to, non-transitory computer-readable media, RAM, ROM, hard drives, flash drives, or other memory devices.

The memory device(s) 424 can store information accessible by the processor(s) 422, including computer-readable instructions 426 that can be executed by the processor(s) 422. The computer-readable instructions 426 can be any set of instructions that when executed by the processor(s) 422, cause the processor(s) 422 to perform operations. The computer-readable instructions 426 can be software written in any suitable programming language or can be implemented in hardware. In some embodiments, the computer-readable instructions 426 can be executed by the processor(s) 422 to cause the processor(s) 422 to perform operations, such as monitor operation of the electronic device 410, as described below with reference to FIG. 9.

The memory device(s) 424 can further store data 428 that can be accessed by the processor(s) 422. For example, the data 428 can include any data used for determining degradation in the performance of the electronic device 410, as described herein. The data 428 can include one or more table(s), function(s), algorithm(s), model(s), equation(s), etc. for determining degradation in the performance of the electronic device 410 according to example embodiments of the present disclosure.

The computing device(s) 420 can also include a communication interface 430 used to communicate, for example, with the communication network 230. The communication interface 430 can include any suitable components for interfacing with the communication network 230, including for example, transmitters, receivers, ports, controllers, antennas, or other suitable components.

In example embodiments, the computing device(s) 420 can monitor communications patterns between two or more electronic device(s) connected to the communication network 230. More specifically, the computing device(s) 420 can monitor the communication patterns during a validation period that includes a period of time during which operation of the electronic device 410 can be validated. In example embodiments, the period of time can span one or more test-flight(s) of the aerial vehicle 100. The test-flight(s) can include a plurality of flight phases indicative of operation of the aerial vehicle 100. The plurality of flight phases can include, without limitation, a standing at gate phase, a taxiing phase, a takeoff phase, a climb phase, a cruise phase, an approach phase and a landing phase.

When the computing device(s) 420 monitor communication patterns during the validation period, the computing device(s) 420 can determine how frequently two electronic device(s) communicate with one another during each phase of the plurality of flight phases. As an example, the computing device(s) 420 can monitor communications between a first electronic device on the network 230 and a second electronic device on the network 230. More specifically, the computing device(s) 420 can determine the first electronic device communicates with the second electronic device every five seconds during the takeoff phase of the test-flight(s). In contrast, the computing device(s) 420 can determine the first electronic device does not communicate with the second electronic device during the cruise phase of the test-flight(s). In this way, the computing device(s) 420 can determine how frequently the first electronic device and the second electronic device communicate with one another during at least the takeoff and cruise phases of the test-flight(s). It should be appreciated, however, that the computing device(s) can determine how frequently two devices communicate with one another during any suitable phase of the test-flight(s).

Alternatively or additionally, the computing device(s) 420 can monitor the content of communications between the first electronic device and the second electronic device. More specifically, the computing device(s) 420 can monitor one or more parameter(s) included in a first data packet originating from the first electronic device. In addition, the computing device(s) 420 can monitor the parameter(s) included in a second data packet originating from the second electronic device and responsive to the first data packet. In example embodiments, the parameter(s) can include, without limitation, data included in a payload section of the second data packet. As will be discussed below in more detail, the communication patterns monitored during the validation period can be used by the computing device(s) 420 to generate a baseline operating profile 600 of the electronic device 410.

Referring now to FIGS. 4 through 6 in combination, the baseline operating profile 600 can be indicative of operation of the electronic device 410 during the validation period. As shown, the baseline operating profile 600 can include a baseline response time of the electronic device 410. In particular, the baseline response time can indicate an amount of time the electronic device 410 takes to respond to a communication originating from another node (e.g., electronic device) of the communication network 230. As an example, the computing device(s) 420 can listen for transmission of a first data packet intended for the electronic device 410. In particular, the first data packet can originate from another electronic device connected to the communication network 230. The computing device(s) 420 can also listen for transmission of a second data packet originating from the electronic device 410 and responsive to the first data packet. The computing device(s) 420 can be configured to determine a time lapse from transmission of the first data packet to transmission of the second data packet. In this way, the computing device(s) 420 can determine a baseline response time of the electronic device 410.

In example embodiments, the baseline operating profile 600 can include a first plurality of values 610 for the baseline response time of the electronic device 410, and each value of the first plurality of values 610 can indicate the baseline response time during one of the flight phases. For example, a first value 612 can indicate the baseline response time of the electronic device 410 during the takeoff phase of the test-flight(s), whereas a second value 614 can indicate the baseline response time of the electronic device 410 during the climb phase. As will be discussed, a tolerance (not shown) can be assigned to each value of the first plurality of values 610 and can be included in the baseline operating profile 600.

In example embodiments, the tolerance can be determined by a manufacturer of the electronic device 410. In addition, the tolerance can include an upper bound and a lower bound for the response time of the electronic device 410. In this way, the upper bound and the lower bound can define a window of time in which the electronic device 410 must transmit a response (e.g., data packet) to a command (e.g., data packet) received from another electronic device on the network 230. The window of time defined by the upper and lower bounds can vary amongst the plurality of flight phases. For example, the window of time during the takeoff phase can be greater than the window of time during the cruise phase. As will be discussed below in more detail, one or more environmental parameter(s) affecting operation of the electronic device 410 can also be included in the baseline operating profile 600.

The environmental parameter(s) can include an operating temperature T of the electronic device 410. In example embodiments, a temperature sensor 440 can be configured to sense the operating temperature T of the electronic device 410. In addition, the temperature sensor 440 can be communicatively coupled to the communication network 230. In example embodiments, the computing device(s) 420 can transmit a first signal $S_1$ to the temperature sensor 440. After receiving the first signal $S_1$, the electronic device 410 can transmit a second signal S2 to the computing device(s) 420 via the communication network 230. More specifically, the second signal S2 can include data indicative of the operating temperature T of the electronic device 410.

The operating temperature T of the electronic device 410 can vary amongst the plurality of flight phases of the test-flight(s). As such, the baseline operating profile 600 can include a plurality of reference values 620 for the operating temperature T. More specifically, each reference value of the plurality of reference values 620 can indicate the operating temperature T during one of the plurality of flight phases. As shown, a first reference value 622 can indicate the operating temperature T during the takeoff phase of the test-flight(s). In addition, a second reference value 624 can indicate the operating temperature T during the climb phase of the test-flight(s).

Alternatively or additionally, the environmental parameter(s) can include a vibration measurement $V_M$ from a sensor 450 configured to sense vibration of the electronic device 410. In example embodiments, the sensor 450 can be communicatively coupled to the communication network 230. In this way, the sensor 450 can transmit the vibration measurement $V_M$ to the computing device(s) 420 via the communication network 230. It should be appreciated that the sensor 450 can be any suitable sensor configured to sense vibration of the electronic device 410. For example, the sensor 450 can be an inertial measurement unit (IMU) that includes an accelerometer, a gyroscope, or both.

The vibration measurement $V_M$ can vary amongst the plurality of flight phases of the test-flight(s). As such, the baseline operating profile 600 can include a plurality of reference values 630 for the vibration measurement $V_M$. Each reference value of the plurality of reference values 630 can indicate the vibration measurement $V_M$ taken during one of the plurality of flight phases. As shown, a first reference value 632 can indicate the vibration measurement $V_M$ taken during the takeoff phase, whereas a second reference value 634 can indicate the vibration measurement $V_M$ taken during the climb phase.

The environmental parameter(s) can also include an amount of traffic (e.g., communications) on the communication network 230. The amount of traffic on the communication network 230 can vary amongst the plurality of phases of the test-flight(s). As such, the baseline operating profile 600 can include a plurality of reference values 640 indicative of the amount of traffic on the communication network 230. Each reference value of the plurality of reference values 640 can indicate an amount of traffic on the communication network 230 during one of the plurality of flight phases. As shown, a first reference value 642 can indicate the amount of traffic on the communication network 230 during the takeoff phase, whereas a second reference value 644 can indicate the amount of traffic on the communication network during the climb phase.

The computing device(s) 420 can be further configured to monitor communications on the communication network 230 during a post-validation period that follows the validation period. The post-validation can span one or more flight(s) of the aerial vehicle 100, and the flight(s) can include a plurality of flight phases. For example, the plurality of flight phases can include, without limitation, a standing at gate phase, a taxiing phase, a takeoff phase, a climb phase, a cruise phase, an approach phase and a landing phase. As will be discussed below in more detail, the computing device(s) 420 can generate a present operating profile 700 (FIG. 7) of the electronic device 410 based, at least in part, on communications monitored during the post-validation period.

When monitoring communications during the post-validation period, the computing device(s) 420 can listen for communications involving the electronic device 410. In this way, the computing device(s) 420 can determine how frequently another electronic device on the network 230 communicates with the electronic device 410. Alternatively or additionally, the computing device(s) 420 can determine the content of communications involving the electronic device 410. More specifically, the content can include, without limitation, one or more parameters associated with data packets transmitted or received by the electronic device 410.

In example embodiments, the computing device(s) 420 can detect transmission of both a third data packet and a fourth data packet during the post-validation period. The third data packet can be from another electronic device on the network 230 and intended for the electronic device 410, whereas the fourth data packet can be indicative of the electronic device 410 responding to the third data packet. The computing device(s) 420 can determine a time lapse from detecting transmission of the third data packet and detecting transmission of the fourth data packet. In this way, the computing device(s) 420 can determine a present response time of the electronic device 410.

In example embodiments, an amount of traffic on the communication network 230 can vary amongst the plurality of flight phases of the flight(s) occurring during the post-validation period. As such, the present operating profile 700 can include a second plurality of values 710 for the present response time of the electronic device 410, and each value of the second plurality of values 710 can indicate the present response time during one of the flight phases. For example, a first value 712 can indicate the present response time of the electronic device 410 during the takeoff phase of the flight(s) occurring during the post-validation period, whereas a second value 714 can indicate the present response time of the electronic device 410 during the climb phase of the flight(s) occurring during the post-validation period. As will be discussed below in more detail, the The present operating profile 700 can also include actual values for the environmental parameter(s) detected during the post-validation period. As shown, the present operating profile 700 can include a plurality of actual values 720 for the operating temperature T, a plurality of actual values 730 for the vibration measurement $V_M$, and a plurality of actual values 740 for the amount of traffic on the communication network 230. More specifically, each value of the plurality of actual values 720 for the operating temperature T can indicate an operating temperature of the electronic device 410 during one of the plurality of flight phases of the flight(s) occurring during the post-validation period. In addition, each value of the plurality of actual values 730 for the vibration measurement $V_M$ can indicate a vibration measurement $V_M$ taken during one of the plurality of flight phases of the flight(s) occurring during the post-validation period. Still further, each value of the plurality of actual values 740 can indicate the amount of traffic on the communication network 230 during one the plurality of flight phases of the flight(s) occurring during the post-validation period. As will be discussed below in more detail, the system 400 can be configured to determine degradation in performance of the electronic device 410 based, at least in part, on the baseline operating profile 600 and the present operating profile 700.

In example embodiments, the computing device(s) 420 can implement a model 452 stored in memory 424 of the computing device(s) 420. The model 452 can implement any suitable machine learning technique in order to classify the present operating profile 700 of the electronic device 410 as either a safe operating profile or an unsafe operating profile. For example, the model 452 can include a machine or statistical learning model structured as one of a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, an artificial neural network model, a C4.5 model, a k-means model, or a combination of one or more of the foregoing. In example embodiments, the model 452 can be a neural network. However, other suitable types of machine or statistical learning models are also contemplated. It will also be appreciated that the model 452 can use certain mathematical methods alone or in combination with one or more machine or statistical learning models to classify the present operating profile 700 using a training set of data.

In example embodiment, the training set of data used to train the model 452 can include the baseline operating profile 600 generated during the validation period. In this way, the computing device(s) 420 can, when implementing the model 452, compare the present operating profile 700 against the baseline operating profile 600. More specifically, the computing device(s) 420 can be configured to compare the present response time of the electronic device 410 against the baseline response time of the electronic device 410. For example, when the aerial vehicle 100 is in the takeoff phase of the flight(s) occurring during the post-validation period, the computing device(s) 420 can compare the first value 712 of the second plurality of values 710 (e.g., present response time) against the first value 612 of the first plurality of values 610 (e.g., baseline response time).

If, for example, the first value 712 indicative of the present response time during the takeoff phase falls outside the tolerance (e.g., window of time) assigned to the first value 612 indicative of the baseline response time during the takeoff phase, the model 452 can determine the present operating profile 700 has deviated from the baseline operating profile 600. It should be appreciated that other data (e.g., actual values of environmental parameters) included in the present operating profile 700 can be compared against corresponding data (e.g., reference values of the environmental parameters) included in the baseline operating profile 600 to improve overall accuracy of the model 452. When the model 452 determines the present operating profile 700 has deviated from the baseline operating profile 600, the model 452 can classify the present operating profile 700 as an unsafe operating profile. If, however, the first value 712 indicative of the present response time during the takeoff phase falls within the tolerance assigned to the first value 612 indicative of the baseline response time during the takeoff phase, the model 452 can classify the present operating profile 700 as a safe operating profile. As will be discussed below in more detail, the model 452 can be further trained to classify the unsafe operating profile as either a degraded operating profile or an unknown operating profile.

In example embodiments, a training set of data can be used to train the model 452 to classify unsafe operating profiles as either a degraded operating profile or an unknown operating profile. More specifically, the training set of data can include one or more historical operating profiles of the electronic device 410 that were previously classified as degraded operating profiles and uploaded to memory 424 of the computing device(s) 420. As will be discussed below in more detail, the historical operating profiles of the electronic device 410 can be updated over time. In this way, the model 452 can compare the unsafe operating profile (e.g., present operating profile 700) against the one or more historical operating profiles to further classify the present operating profile 700 as either a degraded operating profile or an unknown operating profile. If the unsafe operating profile (e.g., the present operating profile 700) corresponds to the one or more historical operating profiles, then the model 452 can classify the unsafe operating profile as a degraded operating profile. If, however, the unsafe operating profile does not match the one or more historical operating profiles, then the model 452 can classify the unsafe operating profile as an unknown operating profile.

In one example embodiment, the degraded operating profile can indicate degradation in the performance of the electronic device 410 due to the failure of one or more local components (e.g., power supply) of the electronic device 410. When the model 452 classifies the unsafe operating profile (e.g., present operating profile 700) as a degraded profile, the model 452 can estimate an amount of time remaining before the electronic device 410 becomes inoperable. In addition, the model 452 can cause the computing device(s) 420 to automatically the schedule the aerial vehicle 100 for maintenance before the estimated amount of time expires. More specifically, the computing device(s) 42 can schedule the aerial vehicle 100 for maintenance at a time when the aerial vehicle is not needed to transport passengers or cargo. In this way, the computing device(s) 420 can minimize downtime for the aerial vehicle 100, which can reduce or eliminate economic losses an owner (e.g., airliner) suffers when the aerial vehicle 100 is grounded for maintenance.

In one example embodiments, the unknown operating profile can indicate that an unauthorized user (e.g., a hacker) has gained control of the electronic device 410 via the communication network 230. When the model 452 classifies the unsafe operating profile (e.g., present operating profile 700) as an unknown operating profile, the model 452 can cause, as will be discussed below in more detail, the computing device(s) 420 to transmit the unknown operating profile to a remote computing device 460 that is off board the aerial vehicle 100.

As shown, the computing device(s) 420 can be communicatively coupled to the remote computing device 460 via any suitable wired or wireless communications link. In example embodiments, the computing device(s) 420 onboard the aerial vehicle 100 can transmit the present operating profile 700 to the remote computing device 460 each time the aerial vehicle 100 lands at an airport. More specifically, the computing device(s) 420 can transmit the present operating profile 700 to the remote computing device 460 once the aerial vehicle 100 docks at a gate of the airport. In some embodiments, the computing device(s) 420 can transmit the most recent data packet (e.g., fourth data packet) that electronic device 410 transmitted just prior to the computing device(s) 420 classifying the present operating profile 700 as an unknown operating profile. In this way, the remote computing device 460 can inspect the contents of the most recent data packet.

As shown, the remote computing device 460 can include one or more processor(s) 462 and one or more memory device(s) 464. The one or more memory device(s) 464 can store information accessible by the one or more processor(s) 462, including computer-readable instructions that can be executed by the one or more processor(s) 462. The memory device(s) 464 can further store data that can be accessed by the one or more processor(s) 462. The remote computing device 460 can also include a communication interface 466 used to communicate, for example, with the one or more computing device(s) 420. The hardware, implementation, and functionality of the components of the remote computing device 460 may operate, function, and include the same or similar components as those described with respect to the one or more computing device(s) 420.

The remote computing device 460 can also include a model 480 stored in the memory device(s) 464. The model 480 can implement any suitable machine learning technique. For example, the model 480 can include a machine or statistical learning model structured as one of a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, an artificial neural network model, a C4.5 model, a k-means model, or a combination of one or more of the foregoing. In example embodiments, the model 480 can be a neural network. However, other suitable types of machine or statistical learning models are also contemplated. It will also be appreciated that the model 480 can use certain mathematical methods alone or in combination with one or more machine or statistical learning models.

In example embodiments, the model 480 can be trained based on a set of training data that can include, for example, an operating profile specific to each electronic device of a plurality of electronic devices that are identical to the electronic device 410 onboard the aerial vehicle 100. More specifically, each electronic device of the plurality of electronic devices can be included onboard one aerial vehicle of a fleet of aerial vehicles that, in some example embodiments, can be identical to the aerial vehicle 100 discussed above with reference to FIGS. 1 and 2. In example embodiments, each electronic device can be connected to a communication network onboard each aerial vehicle. In addition, the operating profile that is specific to each electronic device of the plurality of electronic devices can indicate performance of the electronic device. As will be discussed below in more detail, the model 480 can use the operating profile for each electronic device of the plurality of electronic devices to learn one or more patterns indicative of performance of the electronic device.

In example embodiments, the operating profile for each electronic device of the plurality of electronic devices can include data similar to that included in the present operating profile 700 of the electronic device 410 onboard the aerial vehicle 100. In particular, the operating profile for each electronic device of the plurality of electronic devices can include data indicative of a present response time of the electronic device during each flight phase of the flight(s). In addition, the operating profile for each electronic device can include actual values for one or more environmental parameter(s) affecting operation of the electronic device during each flight phase of the flight(s). In this way, the model 480 can aggregate data included in the operating profile for each electronic device of the plurality of electronic devices to identify one or more patterns indicative of the performance of the plurality of electronic devices.

In example embodiments, one or more parameters (e.g., present response time, environmental parameters, etc.) of the unknown operating profile for the electronic device 410 onboard the aerial vehicle 100 can be compared against corresponding parameters of the operating profile for each electronic device of the plurality of electronic devices that are identical to the electronic device 410. In this way, the model 480 can determine whether the unknown operating profile (e.g., present operating profile 700) of the electronic device 410 should be classified as a safe operating profile or an unsafe operating profile. If the model 480 determines the unknown operating profile should be classified as an unsafe operating profile, the model 480 can compare the unknown operating profile (e.g., present operating state 700) against one or more degraded operating profiles the model 480 learned from aggregating data included in the operating profile for each electronic device of the plurality of electronic devices.

If the unknown operating profile (e.g., present operating profile 700) of the electronic device 410 corresponds to one of the degraded operating profiles learned by the model 480, then the model 480 can classify the unknown operating profile as a degraded operating profile. When the model 480 classifies the unknown operating profile as a degraded operating profile, the model 480 can use data from the operating profile of each electronic device of the plurality of electronic devices to, if needed, adjust the estimated amount of time remaining before the electronic device 410 becomes inoperable. If the model 480 determines the estimated amount of time needs to be adjusted, the model 480 can cause the remote computing device 460 to adjust when the aerial vehicle 100 is scheduled for maintenance. More specifically, the remote computing device 460 can transmit a command to the computing device(s) 420 onboard the aerial vehicle 100. The command can cause the computing device(s) 420 to reschedule a maintenance appointment previously made for the aerial vehicle 100. In this way, the model 480 can be used to more accurately predict the amount of time remaining before the electronic device 410 becomes inoperable.

If, however, the unknown operating profile (e.g., present operating profile) of the electronic device 410 does not correspond to one of the degraded profiles learned by the model 480, then the model 480 can compare the unsafe operating profile of the electronic device 410 against one or more historical operating profiles that have each been classified as an attack profile. In example embodiments, the attack profile can indicate that the electronic device 410 is executing a malicious program (e.g., malware) uploaded to the memory 424 of the electronic device 410. It should be appreciated that the historical operating profiles can be determined based, at least in part, on data from the operating profile for each electronic device of the plurality of electronic devices that are identical to the electronic device 410. If the unknown operating profile of the electronic device 410 does not match one of the historical operating profiles already included in the model 480, then the unknown operating profile can be added to the historical operating profiles included in the model 480. In addition, the model 480 can cause the remote computing device 460 to generate a notification of the unknown operating profile. More specifically, the notification can be an e-mail or any other suitable electronic message viewable by authorized personnel. In this way, authorized personnel can perform forensic analysis on the electronic device 410 onboard the aerial vehicle 100 and develop a patch (e.g., software or hardware) for the attack profile. In example embodiments, the patch can be pushed to each electronic device of the plurality of electronic devices.

In example embodiments, the degraded operating profiles learned by the model 480 executed by the remote computing device 480 can be uploaded to the computing device(s) 420 onboard the aerial vehicle 100. More specifically, the degraded operating profiles can be uploaded to the one or more historical operating profiles included in the model 452 executed by the computing device(s) 420. In this way, the accuracy of the model 452 executed by the computing device(s) 420 onboard each aerial vehicle can be improved.

In alternative embodiments, the model 452 implemented by the computing device(s) 420 onboard the aerial vehicle 100 can classify an unsafe operating profile of the electronic device 410 as one of a degraded operating profile, an attack profile, or an unknown operating profile. It should be appreciated that the model 452 can classify the unsafe operating profile as the degraded operating profile in the same manner as discussed above. In addition, the one or more historical operating profiles included in the model 480 implemented by the remote computing device 460 can be uploaded to the model 452 implemented by the computing device(s) 420 onboard the aerial vehicle. In this way the model 452 can classify compare the unsafe operating profile against the one or more historical operating profiles that have previously been classified as attack profiles. If the unsafe operating profile of the electronic device 410 corresponds to one of the historical operating profiles classified as an attack profile, then the model 452 can classify the unsafe operating profile as an attack profile and take the appropriate action. If, however, the unsafe operating profile of the electronic device 410 cannot be classified as an attack profile, then the model 452 can classify the unsafe operating profile as an unknown operating profile and transmit the unknown operating profile to the remote computing device 460.

Figure 8:
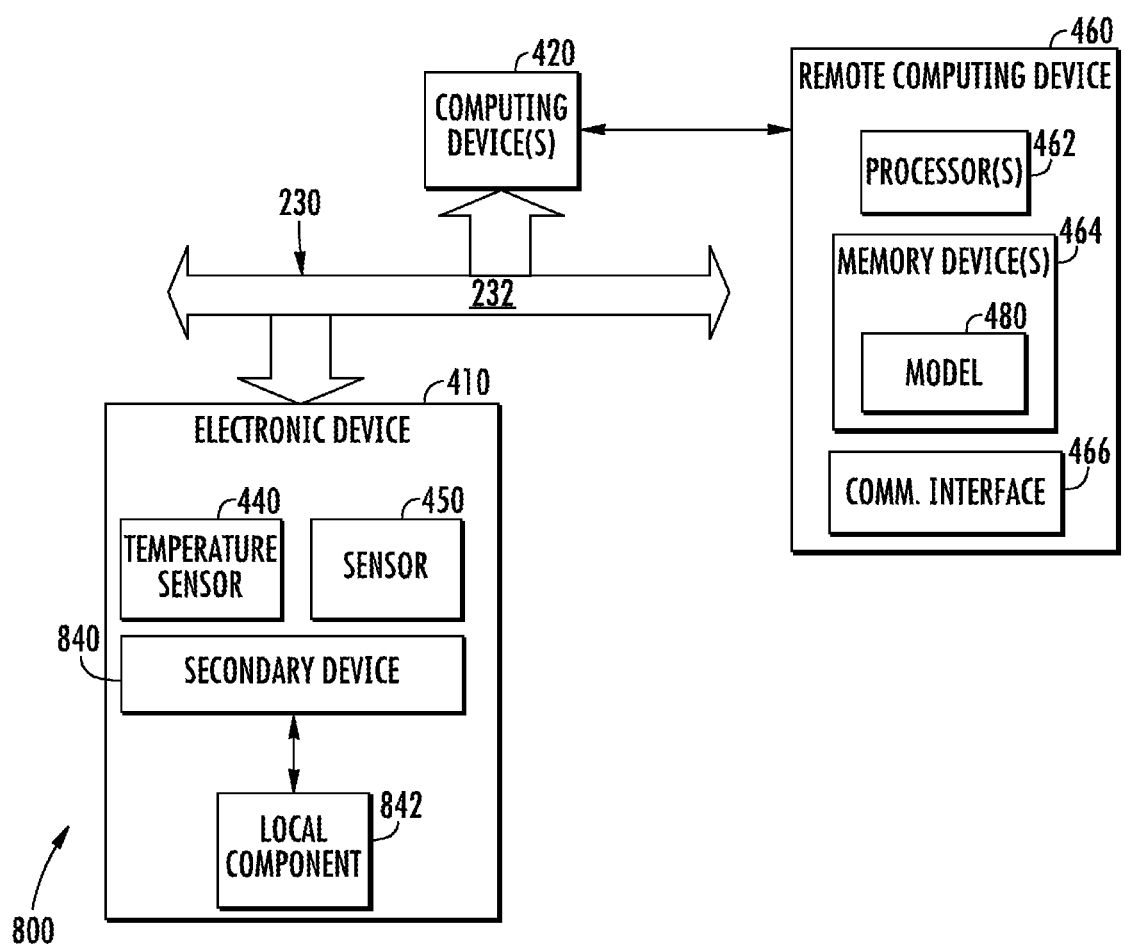
FIG. 8 illustrates another example system for monitoring operation of an electronic device communicatively coupled to a communication network for an aerial vehicle according to example embodiments of the present disclosure.

FIG. 8 another example embodiment of a system 800 for monitoring operation of the electronic device 410 connected to the communication network 230 for the aerial vehicle 100. The system 800 depicted in FIG. 8 may be configured in substantially the same manner as the system 400 depicted in FIG. 4, and accordingly, the same or similar reference numbers may refer to the same or similar parts. For example, the system 800 can include the computing device(s) 420 discussed above with reference to the system 400 of FIG. 4.

However, for the example embodiment depicted in FIG. 8, the system 800 can also include a secondary device 840 configured to monitor one or more signal(s) originating within the electronic device 410. In particular, the secondary device 840 can monitor discrete and/or analog signals of one or more local components 842 of the electronic device 410. In example embodiments, the local component 842 can include, without limitation, an actuator or one or more computing device(s) of the electronic device 410. In addition, the secondary device 840 can monitor discrete and/or analog signals transmitted from or received by the local component 842. In this way, the secondary device 840 can monitor operation of the local component 842. The secondary device 840 can provide local data (e.g. discrete and/or analog signals) to the computing device(s) 420. In this way, the remote computing device 460 can use the local data to improve the accuracy of the model 452. As will be discussed below in more detail, the local data can be used to distinguish attacks by unauthorized attacks from normal degradation of the electronic device 410.

In example embodiments, the local data can indicate that the computing device(s) of the electronic device 410 are dropping data packets. More specifically, the computing device(s) may be ignoring one or more commands received from another electronic device on the communication network 230. The computing device(s) 420 or the remote computing device 460 can correlate the local data with data indicative of the flight phase and one or more environmental parameter(s) to determine a cause of the electronic device, specifically the computing device(s) thereof, dropping data packets. In one example embodiment, the computing device(s) 420 can determine the cause is an unauthorized user gaining access to the electronic device 410. Alternatively, the computing device(s) 420 can determine the cause is degradation of the computing device(s) included in the electronic device 410.

Figure 9:
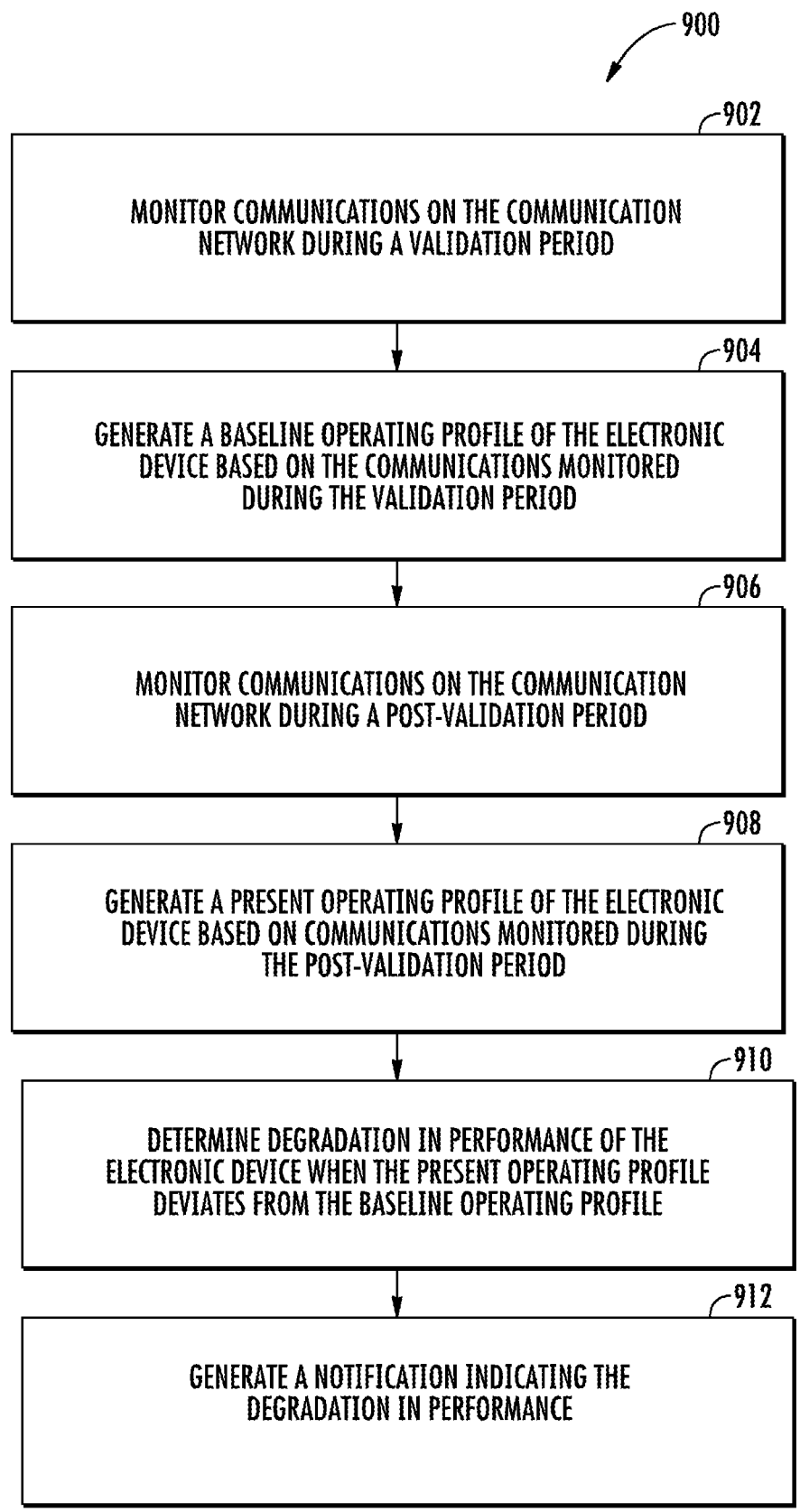
FIG. 9 illustrates a flow diagram of an example method for determining degradation in performance of an electronic device connected to a communication network for an aerial vehicle.

FIG. 9 depicts a flow diagram of an example method 900 for determining degradation in performance of an electronic device connected to a communication network for an aerial vehicle. The method 900 can be implemented using, for instance, the systems 400, 800 of FIGS. 4 and 8. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, performed simultaneously or modified in various ways without deviating from the scope of the present disclosure.

At (902), the method 900 can include monitoring, by one or more computing devices, communications on the communication network during a validation period. Specifically, in example embodiments, the validation period can include one or more test-flight(s) of the aerial vehicle. The test-flight(s) can include a plurality of flight phases such as, without limitation, a takeoff phase, a climb phase, a cruise phase, a descent phase, and a landing phase.

At (904), the method 900 can include generating, by the one or more computing device(s), a baseline operating profile of the electronic device based, at least in part, on the communications monitored during the validation period. Specifically, in example embodiments, the baseline operating profile can include a first plurality of values. In particular, each value of the first plurality of values can indicate a baseline response time of the electronic device during one flight phase of the test-flight(s) occurring during the validation period. In addition, the baseline operating profile can include a plurality of reference values for one or more environmental parameter(s). More specifically, each value of the plurality reference values can indicate a value of the environmental parameter(s) during one flight phase of the test-flight(s).

At (906), the method 900 can include monitoring, by one or more computing devices, communications on the communication network during a post-validation period. Specifically, in example embodiments, the post-validation period can include one or more flight(s) of the aerial vehicle. The flight(s) can include a plurality of flight phases such as, without limitation, a takeoff phase, a climb phase, a cruise phase, a descent phase, and a landing phase.

At (908), the method 900 can include generating, by the one or more computing devices, a present operating profile of the electronic device based, at least in part, on communications monitored during the post-validation period. Specifically, in example embodiments, the present operating profile can include a second plurality of values. In particular, each value of the second plurality of values can indicate a present response time of the electronic device during one flight phase of the flight(s) occurring during the post-validation period. In addition, the present operating profile can include a plurality of reference values for one or more environmental parameter(s). More specifically, each value of the plurality reference values can indicate a value of the environmental parameter(s) during one flight phase of the flight(s) occurring during the post-validation period.

At (910), the method 900 can include determining, by the one or more computing devices, degradation in performance of the electronic device when the present operating profile generated at (908) deviates from the baseline operating profile generated at (904). Specifically, in example embodiments, a first value of the second plurality of values determined at (908) can be compared against a first value of the first plurality of values determined at (904). When the first value of the second plurality of values falls outside a tolerance determined for the first value of the first plurality of values, the one or more computing devices can determine the performance of the electronic device has degraded. In contrast, when the first value of the second plurality of values falls within the tolerance determined for the first value of the first plurality of values, the one or more computing devices can determine the performance of the electronic device has not degraded.

If, at (910), the one or more computing devices determine the performance of the electronic device has degraded, the method 900 can include, at (912), generating, by the one or more computing devices, a notification indicating the degradation in the performance of the electronic device. Specifically, in example embodiments, the notification can be displayed on a flight display of the aerial vehicle. Alternatively or additionally, the notification can be displayed on a feedback device viewable by personnel authorized to schedule the aerial vehicle 100 for maintenance.

In some embodiments, the method 900 can include automatically scheduling, by the one or more computing devices, the aerial vehicle for maintenance. In this way, the aerial vehicle can be scheduled for maintenance at a time that minimizes costs to an owner or operator of the aerial vehicle.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose example embodiments of the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining degradation in performance of an electronic device connected to a communication network for an aerial vehicle, the method comprising:

monitoring, by one or more computing devices, communications on the communication network during a validation period, wherein monitoring communications on the communication network during the validation period comprises:
  detecting, by the one or more computing devices, transmission of a first data packet to the electronic device;
  detecting, by the one or more computing devices, transmission of a second data packet from the electronic device, the second data packet responsive to the first data packet; and
  determining, by the one or more computing devices, a baseline response time of the electronic device, the baseline response time equal to a lapse of time from detecting transmission of the first data packet to detecting transmission of the second data packet;
generating, by the one or more computing devices, a baseline operating profile of the electronic device based, at least in part, on the communications monitored during the validation period;
monitoring, by the one or more computing devices, communications on the communication network during a post-validation period;
generating, by the one or more computing devices, a present operating profile of the electronic device based, at least in part, on the communications monitored during the post-validation period;
determining, by the one or more computing devices, degradation in performance of the electronic device when the present operating profile deviates from the baseline operating profile; and
generating, by the one or more computing devices, a notification indicating the degradation in the performance of the electronic device.

2. The method of claim 1, wherein the validation period spans one or more test-flights of the aerial vehicle, wherein the post-validation period spans one or more flights of the aerial vehicle, and wherein both the one or more test-flights occurring during the validation period and the one or more flights occurring during the post-validation period each include a plurality of flight phases.

3. The method of claim 2, wherein monitoring communication on the communication network during both the validation period and the post-validation period comprises receiving, at the one or more computing devices, data signals from a secondary device associated with the electronic device, the secondary device configured to monitor operation of one or more local components of the electronic device.

4. The method of claim 2, wherein monitoring communications on the communication network during both the validation period and the post-validation period comprises receiving, at the one or more computing devices, one or more environmental parameters affecting operation of the electronic device.

5. The method of claim 4, wherein the one or more environmental parameters comprise at least one of an operating temperature of the first electronic device, a vibration measurement indicative of vibration of the electronic device, and an amount of traffic on the communication network.

6. The method of claim 5, wherein detecting transmission of the first data packet comprises detecting, by the one or more computing devices, transmission of the first data packet to the electronic device during each flight phase of the one or more test-flights, wherein detecting transmission of the second data packet comprises detecting, by the one or more computing devices, transmission of the second data packet from the electronic device during each flight phase of the one or more test-flights, wherein determining the baseline response time of the electronic device comprises determining, by the computing devices, a first plurality of values, and wherein each value of the first plurality of values is indicative of the baseline response time during one flight phase of the one or more test-flights.

7. The method of claim 6, further comprising determining, by the one or more computing devices, a tolerance for each value of the first plurality of values, the tolerance based, at least in part, on the one or more environmental parameters.

8. The method of claim 7, wherein the baseline operating profile comprises the first plurality of values and the tolerance determined for each value of the first plurality of values.

9. The method of claim 8, wherein monitoring communications on the communication network during the post-validation period comprises:
  detecting, by the one or more computing devices, transmission of a third data packet to the electronic device;
  detecting, by the one or more computing devices, transmission of a fourth data packet from the electronic device, the fourth data packet responsive to the third data packet; and
  determining, by the one or more computing devices, a present response time of the electronic device,
  wherein the present response time is equal to a lapse of time from detecting transmission of the third data packet to detecting transmission of the fourth data packet.

10. The method of claim 9, wherein transmission of the third data packet occurs during each flight phase of the one or more flights occurring during the post-validation period, wherein detecting transmission of the fourth data packet occurs during each flight phase of the one or flights occurring during the post-validation period, wherein determining the present response time of the electronic device comprises determining, by the one or more computing devices, a second plurality of values, and wherein each value of the second plurality of values is indicative of the present response time of the electronic device during one flight phase of the one or more flights occurring during the post-validation period.

11. The method of claim 10, wherein the present operating profile comprises the second plurality of values and a plurality of actual values for the one or more environmental parameters, and wherein each value of the plurality of actual values indicates a value of the one or more environmental parameters during one flight phase of the one or more flights occurring during the post-validation period.

12. The method of claim 10, wherein determining degradation in the performance of the electronic device comprises:
  comparing, by the one or more computing devices, the present response time of the electronic device against the baseline response time of the electronic device; and
  determining, by the one or more computing devices, degradation in the performance of the electronic device when the present response time deviates from the baseline response time by a predetermined amount.

13. The method of claim 12, wherein comparing the present response time against the baseline response time comprises comparing, by the one or more computing devices, a first value of the first plurality of values against a first value of the second plurality of values, wherein the first value of the first plurality of values is indicative of the baseline response time during a first flight phase, and wherein the first value of the second plurality of values is indicative of the present response time during the first flight phase.

14. The method of claim 1, wherein the one or more computing device are onboard the aerial vehicle, and wherein determining the present operating profile deviates from the baseline profile comprises:
   classifying, by the one or more computing devices, the present operating profile of the electronic device as an unsafe operating profile; and
   when the present operating profile is classified as the unsafe operating profile, classifying, by the one or more computing devices, the unsafe operating profile as either a degraded operating profile or an unknown operating profile,
   wherein the computing device(s) are configured to classify the present operating profile as the unsafe operating profile based on a model implemented by the computing device(s), and
   wherein the computing device(s) are configured to classify the unsafe operating profile as either the degraded operating or the unknown profile based, at least in part, on the model.

15. The method of claim 14, wherein when the present operating is classified as the unknown operating profile, determining the present operating profile deviates from the baseline operating profile further includes:
   transmitting, by the computing device(s), the present operating profile to a remote computing device; and
   updating, by the remote computing device, the model implemented by the computing device(s) onboard the aerial vehicle based, at least in part, on a model implemented by the remote computing device,
   wherein the model implemented by the remote computing device is trained, at least in part, on data from a plurality of electronic devices that are identical to the electronic onboard the aerial vehicle.

16. The method of claim 15, wherein both the model implemented by the computing device(s) and the model implemented by the remote computing device is a machine or statistical learning model structured as one of a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, an artificial neural network model, a C4.5 model and a k-means model.

17. A system for determining degradation in performance of an electronic device connected to a communication network for an aerial vehicle, the system comprising:
   one or more computing devices connected to the communication network, the one or more computing devices comprising one or more processors and one or more memory devices, the one or more memory storing instructions that when executed by the one or more processors cause the one or more processors to perform operations, the one or more computing devices configured to:
   monitor communications on the communication network during a validation period;
   detect transmission of a first data packet to the electronic device;
   detect transmission of a second data packet from the electronic device, the second data packet responsive to the first data packet;
   determine a baseline response time of the electronic device, the baseline response time equal to a lapse of time from detecting transmission of the first data packet to detecting transmission of the second data packet;
   generate a baseline operating profile of the electronic device based, at least in part, on the communications monitored during the validation period;
   monitor communications on the communication network during a post-validation period;
   generate a present operating profile of the electronic device based, at least in part, on the communications monitored during the post-validation period;
   determine degradation in performance of the electronic device when the present operating profile deviates from the baseline operating profile; and
   automatically schedule the aerial vehicle for maintenance when the present operating profile deviates from the baseline operating profile.

18. The system of claim 17, wherein the validation period spans one or more test-flights of the aerial vehicle, wherein the post-validation period spans one or more flights of the aerial vehicle, and wherein both the one or more test-flights occurring during the validation period and the one or more flights occurring during the post-validation period each include a plurality of flight phases.

19. The system of claim 17, wherein the one or more computing devices are further configured to receive one or more environmental parameters indicative of operation of the electronic device, wherein the one or more computing devices are configured to receive the one or more environmental parameters during both the validation period and the post-validation period.

* * * * *